US011212566B1

(12) United States Patent
Swinson et al.

(10) Patent No.: US 11,212,566 B1
(45) Date of Patent: Dec. 28, 2021

(54) SYSTEMS AND METHODS FOR ATTRIBUTING TV CONVERSIONS

(71) Applicant: Tatari, Inc., San Francisco, CA (US)

(72) Inventors: Michael D. Swinson, Santa Monica, CA (US); Lin O'Driscoll, Mammoth Lakes, CA (US)

(73) Assignee: TATARI, INC., San Francisco, CA (US)

(*) Notice: Subject to any disclaimer, the term of this patent is extended or adjusted under 35 U.S.C. 154(b) by 349 days.

(21) Appl. No.: 16/365,448

(22) Filed: Mar. 26, 2019

Related U.S. Application Data

(60) Provisional application No. 62/647,964, filed on Mar. 26, 2018.

(51) Int. Cl.
*H04N 21/81* (2011.01)
*H04N 21/25* (2011.01)
*H04N 21/24* (2011.01)
*H04N 21/431* (2011.01)

(52) U.S. Cl.
CPC ....... *H04N 21/251* (2013.01); *H04N 21/2407* (2013.01); *H04N 21/4312* (2013.01); *H04N 21/812* (2013.01)

(58) Field of Classification Search
CPC .................................................. H04N 21/812
See application file for complete search history.

(56) References Cited

U.S. PATENT DOCUMENTS 10,467,653 B1 * 11/2019 Avedissian ....... H04N 21/41415
10,497,021 B1    12/2019 Eberstein
11,132,706 B1     9/2021 Swinson
2007/0174114 A1   7/2007 Bigby
2008/0004884 A1   1/2008 Flake
2008/0082381 A1   4/2008 Muller
(Continued)

FOREIGN PATENT DOCUMENTS

GB      2550839        12/2017
WO   WO 2014011139     1/2014
WO   WO 2020005240     1/2020

OTHER PUBLICATIONS

Office Action for U.S. Appl. No. 16/363,801, dated Jul. 7, 2020, 19 pgs.
(Continued)

*Primary Examiner* — Michael H Hong
(74) *Attorney, Agent, or Firm* — Sprinkle IP Law Group

(57) ABSTRACT

An attribution system aggregates and merges online data and offline chronologically. The attribution system examines merged data for unique visitor (UV) sessions initiated at an online medium (e.g., a website) within an attribution window for a spot that aired on an offline medium (e.g., a television network) and, for each conversion event that occurred in a UV session, assigns a session timestamp to it so that the conversion event is correlated to the spot. The attribution system then determines an overall conversion rate of UVs to the online medium in the attribution window and the attribution by the spot that aired on the offline medium to the overall conversion rate of UVs to the online medium in the attribution window. Results of the offline attribution to the online conversions can be visualized and presented on a client device communicatively connected to the attribution system.

20 Claims, 9 Drawing Sheets

(56) References Cited

U.S. PATENT DOCUMENTS

| | | |
|---|---|---|
| 2008/0255904 A1 | 10/2008 | Park |
| 2009/0006188 A1 | 1/2009 | Guo |
| 2009/0049468 A1 | 2/2009 | Shkedi |
| 2009/0172728 A1 | 7/2009 | Shkedi |
| 2009/0254420 A1 | 10/2009 | Curd |
| 2010/0082424 A1 | 4/2010 | Yerneni |
| 2010/0228593 A1 | 9/2010 | Belwadi |
| 2010/0287029 A1 | 11/2010 | Dodge |
| 2011/0087546 A1 | 4/2011 | Fordyce |
| 2011/0119126 A1 | 5/2011 | Park |
| 2011/0167145 A1 | 7/2011 | Bush |
| 2011/0231245 A1 | 9/2011 | Bhatia |
| 2011/0246297 A1 | 10/2011 | Buchalter |
| 2011/0302022 A1 | 12/2011 | Fordyce |
| 2012/0054019 A1 | 3/2012 | Kitts |
| 2012/0072997 A1 | 3/2012 | Carlson |
| 2012/0096489 A1 | 4/2012 | Shkedi |
| 2012/0109749 A1 | 5/2012 | Subramanian |
| 2012/0158505 A1 | 6/2012 | Jaladanki |
| 2013/0046621 A1 | 2/2013 | Asseoff |
| 2013/0117454 A1 | 5/2013 | Rangarajan |
| 2013/0268357 A1 | 10/2013 | Heath |
| 2014/0006158 A1 | 1/2014 | Cooper |
| 2014/0012659 A1 | 1/2014 | Yan |
| 2014/0082664 A1 | 3/2014 | Shkedi |
| 2014/0164101 A1 | 6/2014 | S |
| 2014/0222549 A1 | 8/2014 | Bruich |
| 2014/0223458 A1 | 8/2014 | Smith |
| 2014/0236705 A1 | 8/2014 | Shao |
| 2014/0244368 A1 | 8/2014 | Singhania |
| 2014/0257979 A1 | 9/2014 | Luke |
| 2014/0289004 A1 | 9/2014 | Monforte |
| 2014/0316883 A1 | 10/2014 | Kitts |
| 2014/0337122 A1 | 11/2014 | Bansal |
| 2014/0358666 A1 | 12/2014 | Baghaie |
| 2015/0046249 A1 | 2/2015 | Qi |
| 2015/0149277 A1 | 5/2015 | Mankoff |
| 2015/0154632 A1 | 6/2015 | Jindal |
| 2015/0186925 A1 | 7/2015 | Chittailappilly |
| 2015/0235261 A1 | 8/2015 | Shulman |
| 2015/0237395 A1 | 8/2015 | Barney |
| 2015/0262221 A1 | 9/2015 | Nakano |
| 2015/0269606 A1 | 9/2015 | Hewett |
| 2015/0341684 A1 | 11/2015 | Kitts |
| 2016/0019582 A1 | 1/2016 | Bindra |
| 2016/0117355 A1 | 4/2016 | Krishnamurthy |
| 2016/0134934 A1 | 5/2016 | Jared |
| 2016/0155141 A1 | 6/2016 | Song |
| 2016/0180375 A1 | 6/2016 | Rose |
| 2016/0210658 A1 | 7/2016 | Chittilappilly |
| 2016/0210659 A1 | 7/2016 | Chittilappilly |
| 2016/0225014 A1 | 8/2016 | Mitra |
| 2016/0358227 A1 | 12/2016 | McAfee |
| 2017/0034591 A1 | 2/2017 | Ray |
| 2017/0091809 A1 | 3/2017 | Liu |
| 2017/0091810 A1 | 3/2017 | McGovern |
| 2017/0195748 A1 | 7/2017 | Shkedi |
| 2017/0201374 A1 | 7/2017 | Bosworth |
| 2017/0223425 A1 | 8/2017 | Kitts |
| 2017/0228768 A1 | 8/2017 | Saxena |
| 2017/0238025 A1 | 8/2017 | Riedl |
| 2017/0323330 A1 | 11/2017 | Chittilappilly |
| 2017/0330219 A1 | 11/2017 | Feldman |
| 2017/0337578 A1 | 11/2017 | Chittilappilly |
| 2017/0337588 A1 | 11/2017 | Chittilappilly |
| 2018/0005140 A1 | 1/2018 | Chittilappilly |
| 2018/0068343 A1 | 3/2018 | Hammock |
| 2018/0096397 A1 | 4/2018 | Goeldi |
| 2018/0139514 A1 | 5/2018 | Smith |
| 2018/0152766 A1 | 5/2018 | Kitts |
| 2018/0218383 A1 | 8/2018 | Shen |
| 2018/0260715 A1 | 9/2018 | Yan |
| 2018/0285469 A1 | 10/2018 | Hahn |
| 2018/0338189 A1 | 11/2018 | Ray |
| 2018/0357678 A1 | 12/2018 | Diorio |
| 2019/0050891 A1 | 2/2019 | Chung |
| 2019/0050893 A1 | 2/2019 | Stuttle |
| 2019/0087469 A1 | 3/2019 | Zhang |
| 2019/0104199 A1 | 4/2019 | Rothman |
| 2019/0138563 A1 | 5/2019 | Odgen |
| 2019/0141013 A1 | 5/2019 | Mail |
| 2019/0236639 A1 | 8/2019 | Mitra |
| 2019/0273961 A1 | 9/2019 | Kitts |
| 2019/0278378 A1 | 9/2019 | Yan |
| 2019/0318379 A1 | 10/2019 | Patel |
| 2019/0378074 A1 | 12/2019 | McPhatter |
| 2020/0027121 A1 | 1/2020 | Avedissian |
| 2020/0065854 A1 | 2/2020 | Eberstein |

OTHER PUBLICATIONS

Office Action for U.S. Appl. No. 16/360,456, dated Oct. 13, 2020, 13 pgs.

Office Action for U.S. Appl. No. 16/363,801, dated Jan. 15, 2021, 22 pgs.

Bhatia, Tarun, et al., Method and System of Scaling Online-Offline Ad Effectiveness Measurements across Devices in a Network, IP.com Prior Art Database Technical Disclosure, IPCOM000226497D, Apr. 9, 2013, 6 pgs.

Office Action for U.S. Appl. No. 16/705,813, dated Mar. 8, 2021, 15 pgs.

Cleveland, William S., Robust Locally Weighted Regression and Smoothing Scatterplots, Journal of the American Statistical Association, Theory and Methods Section, vol. 74, No. 368, DOI: 10.1080/01621459.1979.10481038, Dec. 1979, pp. 829-836.

Andreas F. Ruckstuhl, et al., Baseline subtraction using robust local regression estimation, Journal of Quantitative Spectroscopy and Radiative Transfer, vol. 68, Issue 2, 2001, pp. 179-193 (ISSN 0022-4073).

Lambert, Diane, et al, Online Effects of Offline Ads, in ADKDD '08: Proceedings of the 2nd International Workshop on Data Mining and Audience Intelligence for Advertising, New York: Association for Computing Machinery, pp. 10-17, 2008.

Office Action for U.S. Appl. No. 16/360,456, dated Apr. 27, 2021, 16 pgs.

Eisenberg, Andrew, et al, "SQL:2003 Has Been Published," ACM.org, SIGMOD Record, vol. 33, No. 1, Mar. 2004, pp. 119-126.

Notice of Allowance for U.S. Appl. No. 16/363,801, dated Apr. 28, 2021, 9 pgs.

Advertisement System, Method and Computer Program Product, an IP.com Prior Art Database Technical Disclosure, IPCOM000138557D, Jul. 24, 2006, 40 pgs.

Weng, Chien-I, et al., Did you LINE Today? Strategies for Creating LINE Online to Offline Customer Experiences, 49th Hawaii Int'l Conf. on System Sciences, IEEE Computer Society, 2016, pp. 2136-2145.

Office Action for U.S. Appl. No. 16/706,061, dated May 11, 2021, 18 pgs.

Office Action for U.S. Appl. No. 16/705,813, dated Jun. 21, 2021, 23 pgs.

Gallego, Victor, et al., Assessing the effect of advertising expenditures upon sales: a Bayesian structural time series model, Appl. Stoch. Model. Bus. Ind., 35, 2019, pp. 479-491, at https://doi.org/10.1002/asmb.2460, 21 pgs.

Du, Rex Y., et al., "TV Ads and Search Spikes: Toward a Deeper Understanding," MIS quarterly, Feb. 23, 2017, 35 pgs.

Kitts, Brendan, "Can Television Advertising Impact Be Measured on the Web? Web Spike Response as a Possible Conversion Tracking System for Television," in Proceedings of the Eighth Int'l Workshop on Data Mining on Online, ADKDD'14, Aug. 24-27, 2014, New York, NY, 9 pgs. at http://dx.doi.org/10.1145/2648584.2648591.

Cetintas, Suleyman, et al., Forecasting user visits for online display advertising, Inf Retrieval 16, pp. 369-390, 2013, at https://doi.org/10.1007/S10791-012-9201-4.

Komsta, L., Comparison of Several Methods of Chromatographic Baseline Removal with a New Approach Based on Quantile Regression, Chromatographia 73, 2011, pp. 721-731, at https://doi.org/10.1007/s10337-011-1962-1.

(56) References Cited

OTHER PUBLICATIONS

Zhang, Zhi-Min, et al., Baseline correction using adaptive iteratively reweighted penalized least squares, Analyst (www.rsc.org/analyst), 135, 2010, pp. 1138-1146, doi:10.1039/b922045c.
Baek, Sung-June, et al., Baseline correction using asymmetrically reweighted penalized least squares smoothing, Analyst (www.rsc.org/analyst), 140, 2015, pp. 250-257.
Notice of Allowance for U.S. Appl. No. 16/363,801, dated Aug. 16, 2021, 7 pgs.

\* cited by examiner

SYSTEMS AND METHODS FOR ATTRIBUTING TV CONVERSIONS

CROSS-REFERENCE TO RELATED APPLICATION(S)

This application claims a benefit of priority under 35 U.S.C. § 119(e) from the filing date of U.S. Provisional Application No. 62/647,964, filed on Mar. 26, 2018, entitled "SYSTEMS AND METHODS FOR ATTRIBUTING TV CONVERSIONS," the entire disclosure of which is fully incorporated by reference herein for all purposes.

TECHNICAL FIELD

This disclosure relates generally to correlated data processing. More particularly, this disclosure relates to systems, methods, and computer program products for correlated data processing of online media data and offline media data, useful in bridging a data gap in attributing TV conversions.

BACKGROUND OF THE RELATED ART

Traditionally, television (TV) networks rely on a ratings system known as the Nielsen ratings provided by Nielsen Media Research, headquartered in New York, N.Y., U.S.A., to determine the audience size and composition of television programming in the United States. The Nielsen ratings are gathered in one of two ways—using viewer diaries or set meters attached to TVs in selected homes. The former requires a target audience self-record their viewing habits. The latter requires a special device to collect specific viewing habits on a minute to minute basis and send the collected information to the Nielsen's ratings system over a phone line.

With the advent of the Internet, many aspects of modern life are now digitally connected through the seemingly ubiquitous smart phones, smart TVs, smart home appliances, Internet of Things (IoT) devices, websites, mobile apps, etc. Even so, many more analog aspects remain disconnected from this digital world. Linear TV is an example of an offline medium that is disconnected from the digital world.

"Linear TV" refers to real time (live) television services that transmit TV program schedules. Almost all broadcast TV services can be considered as linear TV. Non-linear TV covers streamlining and on-demand programming, which can be viewed at any time and is not constrained by real-time broadcast schedules. Video-on-demand (VOD) and near video-on-demand (NVOD) transmissions of pay-per-view programs over channel feeds are examples of non-linear TV.

Because linear TV is an offline medium, it is not possible to automatically collect information on viewers of linear TV. Accordingly, the Nielsen ratings system still plays an important role in how today's TV networks determine the value of their television shows. However, while the Nielsen's ratings system can provide some quantified measures of audience response to TV programs, the Nielsen ratings do not measure conversion rates for TV commercials.

SUMMARY OF THE DISCLOSURE

Embodiments disclosed herein provide new systems and methods for attributing conversion events originating from spots aired on linear TV. In this disclosure, "spots" refers to media creatives that aired on certain TV networks (hereinafter "networks") at certain timeslots and/or geographical locations. A creative (which refers to content created for a particular purpose or campaign) can have multiple spots that aired on different networks, at different times, under different cost structures.

In some embodiment, a method for attributing online conversion events originating from offline events such as spots airing on networks can be implemented on an attribution system having an attribution analyzer, a visualizer, and a data store. The method can include aggregating online data (e.g., clickstream data from a website) and offline data (e.g., spot airing data from a network), merging the online data and the offline data chronologically, and examining data from the merging for unique visitor (UV) sessions initiated at an online medium (e.g., the website) within an attribution window of time for a spot that aired on an offline medium (e.g., the network). In some embodiments, this examination can include determining, for each UV session of the UV sessions, whether a conversion event occurred at the online medium in the each UV session and, responsive to the conversion event occurring at the online medium in the each UV session, assigning a session timestamp to the conversion event. This session stamp indicates a start of the particular UV session. The assignment of this session timestamp to the conversion event correlates the conversion event with the spot that aired on the offline medium.

In some cases, a time gap may exist between when a UV visits a website and when a conversion of that UV occurs. Accordingly, in some embodiments, the method may further comprise determining whether a time gap exists between a timestamp associated with a start of a UV session associated with a UV and a timestamp for a conversion of the UV. Responsive to finding the time gap, the attribution system is operable to compare the time gap with a predetermined threshold (e.g., five days, a week, three months, etc.) and, responsive to the time gap exceeding the predetermined threshold, the attribution system is operable to determine an appropriate session timestamp for the conversion event. For instance, the attribution system may determine a UV session associated with the UV that is temporally the closest to the timestamp for the conversion of the UV and utilizes a timestamp of that UV session as the session timestamp for the conversion event.

In some embodiments, once all the conversions are correlated to the attribution window of interest (also referred to herein as a cohort), the method may further comprise determining an overall conversion rate of UVs to the online medium in the attribution window and determining the attribution by the spot that aired on the offline medium to the overall conversion rate of UVs to the online medium in the attribution window. In some embodiments, this determination can include examining, on a minute by minute basis, the overall conversion rate relative to a specific lift in the UVs to the online medium that is caused by the offline medium in the attribution window of time.

In some embodiments, this determination can include isolating the specific lift caused by the offline medium in the attribution window of time from a total lift in the UVs to the online medium. The total lift can be determined using a UV baseline. The UV baseline can be established using the chronologically merged online and offline data. On the specific lift is isolated, an alpha factor can be determined. This alpha factor represents a ratio between a conversion rate of UVs driven to the online medium by the spot that aired on the offline medium and a conversion rate of UVs to the online medium not driven by the spot that aired on the offline medium. The alpha factor is utilized by the attribution system to adjust the overall conversion rate of UVs to the online medium in the attribution window of time. This adjustment reflects the offline medium's attribution to the online medium's conversions.

Results generated by the attribution analyzer can be utilized by the visualizer to generate a visualization for presentation on a client device. The visualization graphically illustrates, through a user interface, the attribution by the spot that aired on the offline medium to the overall conversion rate of UVs to the online medium in the attribution window of time. The visualization can show how the spot performs relative to time and other spot by different metrics (e.g., by network, by proportional conversion rate, by customer acquisition cost, etc.).

The visualizer of the attribution system can generate various visualizations that can offer rich, contextual information aggregated by and at the attribution system. For instance, the visualizer can generate graphs based on viewership of the television network and on the UVs of the website, order data points of the graphs by time, and overlay these graphs chronologically. The visualization of these graphs can be interactive, allowing a user to drill down to a cohort and review overlaid data points (e.g., UVs, baseline, networks, etc.) on a minute by minute basis.

One embodiment may comprise a system having a processor and a memory and configured to implement the method disclosed herein. One embodiment may comprise a computer program product that comprises a non-transitory computer-readable storage medium which stores computer instructions that are executable by a processor to perform the method disclosed herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
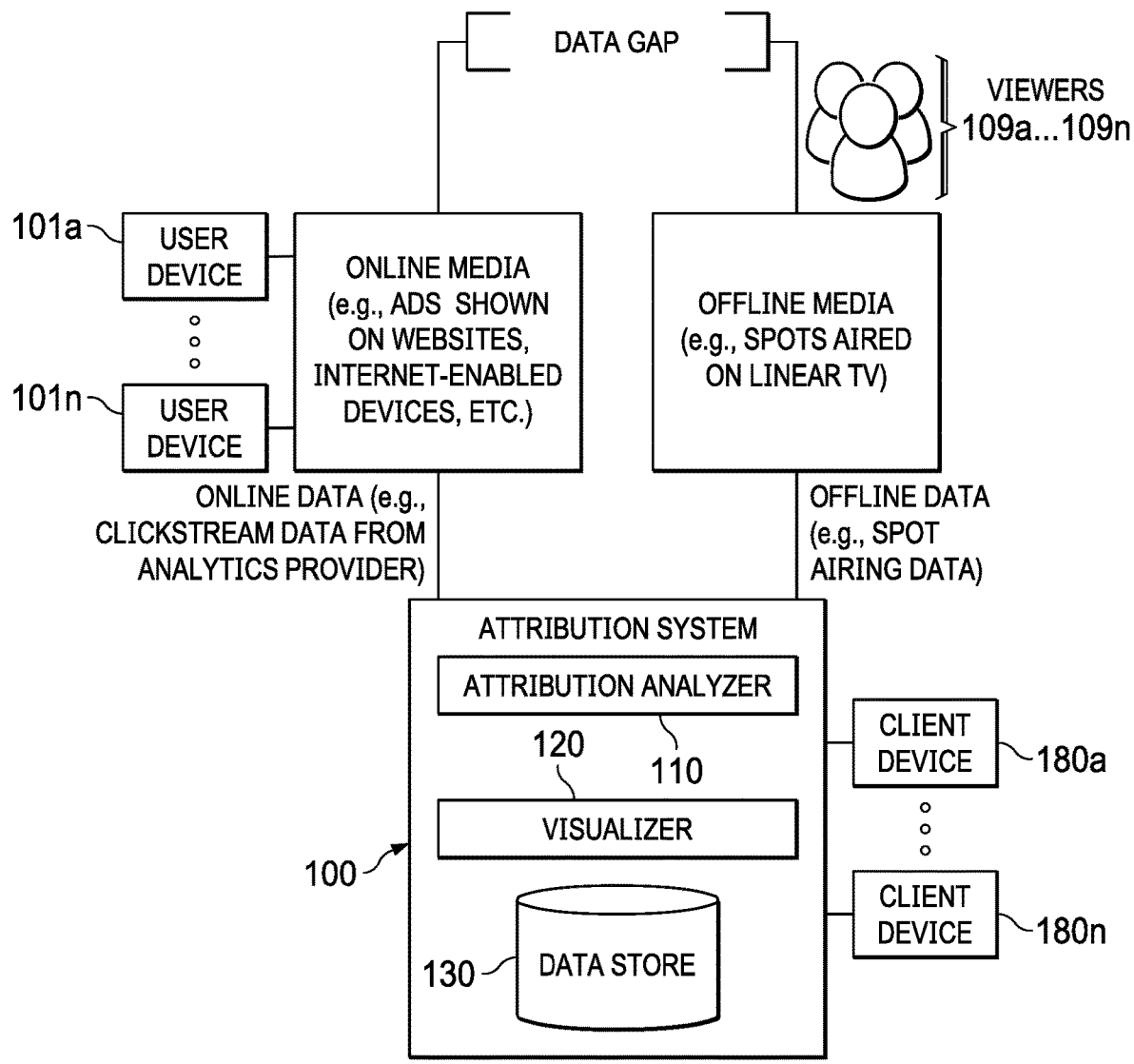
FIG. 1 depicts a diagrammatic representation of an attribution system that bridges a data gap between the online world and the offline world according to some embodiments.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As alluded to above, while the Nielsen's ratings system can provide some quantified measures of audience response to TV programs, the Nielsen ratings do not measure conversion rates for TV commercials. This is, in part, because there is a natural distinction between different types of media (which, collectively, refers to the main means of mass communication such as broadcasting, publishing, and the Internet): online (e.g., search engine marketing) and offline (e.g., linear TV).

Online media is effective when consumers are already accessing the Internet through a website or an application (e.g., a mobile application, an email application, etc.). When a user is attracted to a product and visits a website for the product or service, the website can be seen as an online advertising channel and there is a session associated with that online advertising channel. The user's interactions with the website and activities on the website (which can also be referred to as surfing the website) can be logged or otherwise tracked (e.g., by a web server hosting the website) and associated with the session. This tracking can begin when the user arrives at the website. When the user arrives at the website from an email or another website (which can be referred to as a referral source) through a special link (e.g., a universal resource identifier or locator embedded in the body of the email or a page or pages of the referral site as a tracking pixel), information about the referral source is recorded as well. A tracking pixel is an HyperText Markup Language (HTML) code snippet known to those skilled in the art and thus is not further described herein.

Because the user's movements and clicks with respect to the website can be monitored throughout the session, determining whether the session results in a conversion event is a relatively straightforward process. This process can entail examining the session data, extracting information about the referral source, and directly attributing (giving credit where credit is due) the conversion event to the referral source. A conversion event, in this case, can be any configurable goal of the online medium at issue (e.g., in this example, the website), for instance, an email registration, a purchase, a download, a signature, a subscription, etc.

This kind of direct attribution is not possible with offline media. For instance, it is not possible to directly attribute a user's conversion event at a website to an offline event such as a spot airing on a network through linear TV. This is because offline media aims to drive consumers first to the Internet and then to a website or application associated with a particular product or service. Further, unlike online media, there is neither session tracking nor a direct relationship between an offline medium and the desired result (e.g., a conversion event). Thus, suppose a spot that aired on a network encouraged its viewer to visit a website or download an application, it can be extremely difficult to measure the impact of that spot and quantifiably attribute any website visit or conversion event to the particular spot. As illustrated in FIG. 1, this natural distinction between the different types of media creates a data gap between the digital world and the analog world.

From the perspective of a website, although the general traffic contribution from a network (which represents an offline medium) to the website (which represents an online medium) can be assessed from the immediate lift approximation, there is no digital evidence for attributing specific online conversion events at the website to the network. For example, after a spot aired on the network at a certain time, a web server hosting the website mentioned in the spot can detect an immediate visitor lift at the website. However, the web server has no way of knowing which user visits the website because of the spot. There is not a one-to-one relationship between a website visitor and TV viewership. Further, there is not a session variable or tag that the web server can use to track whether a user's visit comes "from TV." This means that if the user's visit to the website results in a conversion event, it is not possible to directly attribute this conversion event to the network. This creates a challenge to estimate TV contribution to website conversions.

To overcome this challenge, embodiments disclosed herein provide new systems and methods for attributing TV conversions—conversion events originating from spots aired on an offline medium (e.g., linear TV). The attribution technology disclosed herein can be useful for measuring effectiveness of linear TV spots.

As exemplified in FIG. 1, in some embodiments, the attribution technology disclosed herein can be realized in attribution system 100 that bridges the digital world and the analog world. Attribution system 100 can run on one or more server machines and can include attribution analyzer 110 and visualizer 120.

In some embodiments, attribution system 100 can aggregate online data from online media (e.g., clickstream data collected by a server hosting an online medium) and offline data from offline media (e.g., spot airing data associated spots aired on a network) in data store 130. Generally, a clickstream, also referred to as a click path, refers to a record of a user's activities on the Internet. A clickstream can include a sequence of hyperlinks that the user has followed within a website and/or across multiple websites and can include timestamps documenting the user's chronological movements and web surfing activities. Clickstream data can include multiple clickstreams of multiple users in the online world.

In some embodiments, attribution system 100 does not directly collect information about viewers 109a . . . 109n in the offline world. However, viewers 109a . . . 109n may include users of the online world. Encouraged by a spot that they saw while watching a TV show on an offline medium, some viewers may visit an online medium (e.g., a website, an application, etc.) using their devices (e.g., user device 101a, 101n, etc.).

In some embodiments, attribution system 100 can, through attribution analyzer 110 with the data thus aggregated from online and offline media, compute the attribution of TV spots that aired in an attribution window through an offline medium (e.g., a network) to conversion events that took place during the attribution window through an online medium (e.g., a website, an application, etc.). In some embodiments, visualizer 120 is operable to prepare a user interface or dashboard using the outcomes from attribution analyzer 110 (e.g., event metrics, spot performance measures, etc.) for presentation on client devices 180a . . . 180n communicatively connected to attribution system 100.

Figure 2:
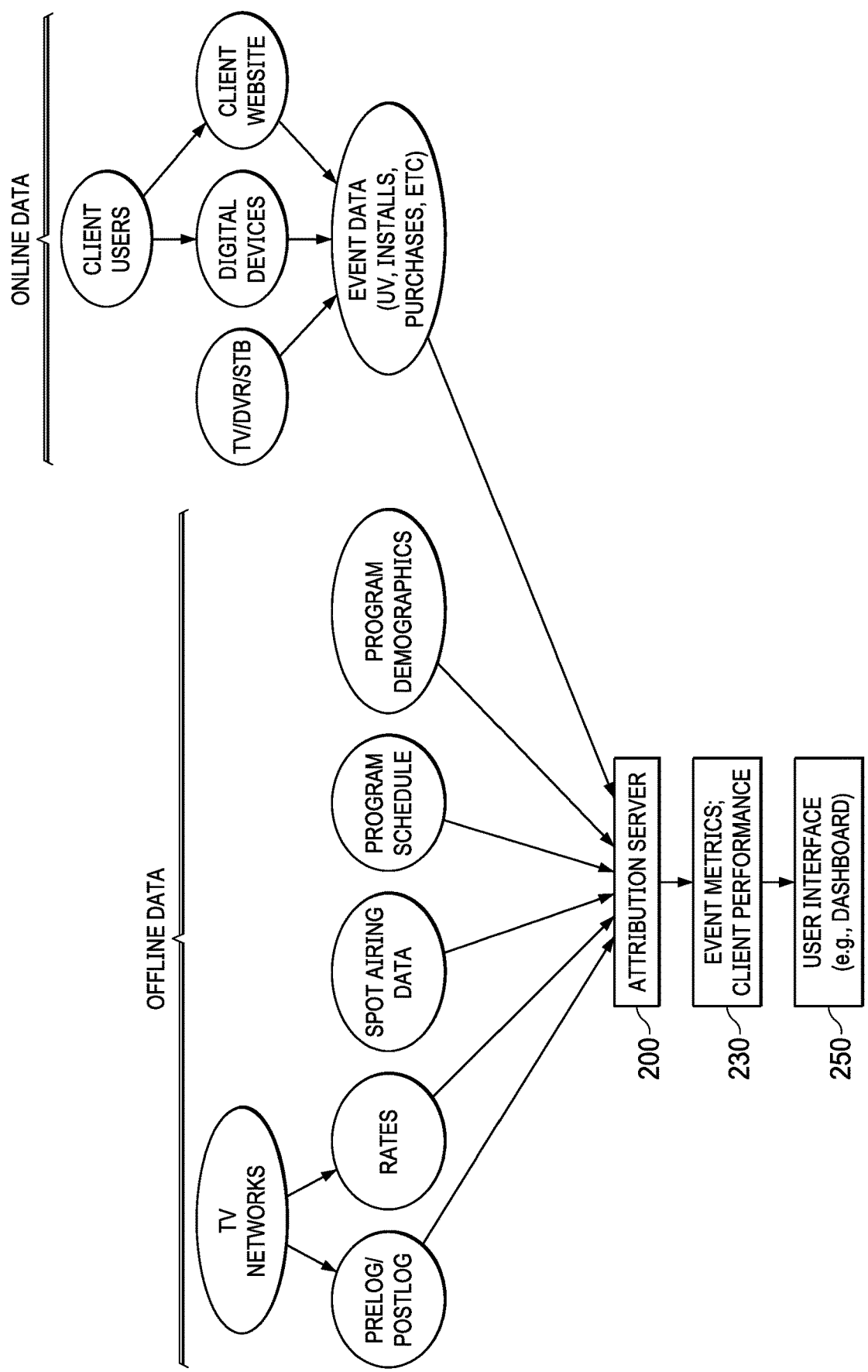
FIG. 2 depicts a diagrammatic representation of an attribution server communicatively connected to a variety of online and offline data sources according to some embodiments.

FIG. 2 shows examples of disparate online and offline data sources and data types that can be aggregated by attribution server 200 which, in one embodiment, can implement attribution system 100 shown in FIG. 1. In some embodiments, outputs 230 that can be generated by attribution server 200 can include TV conversion attribution to the overall conversion rate. In some embodiments, outputs 230 can be visualized and presented through user interface (UI) or dashboard 250 to show performance measurements of TV conversion attribution by different metrics (e.g., TV conversion attribution by network, spot cost, etc.). These aspects are further explained below.

Figure 3:
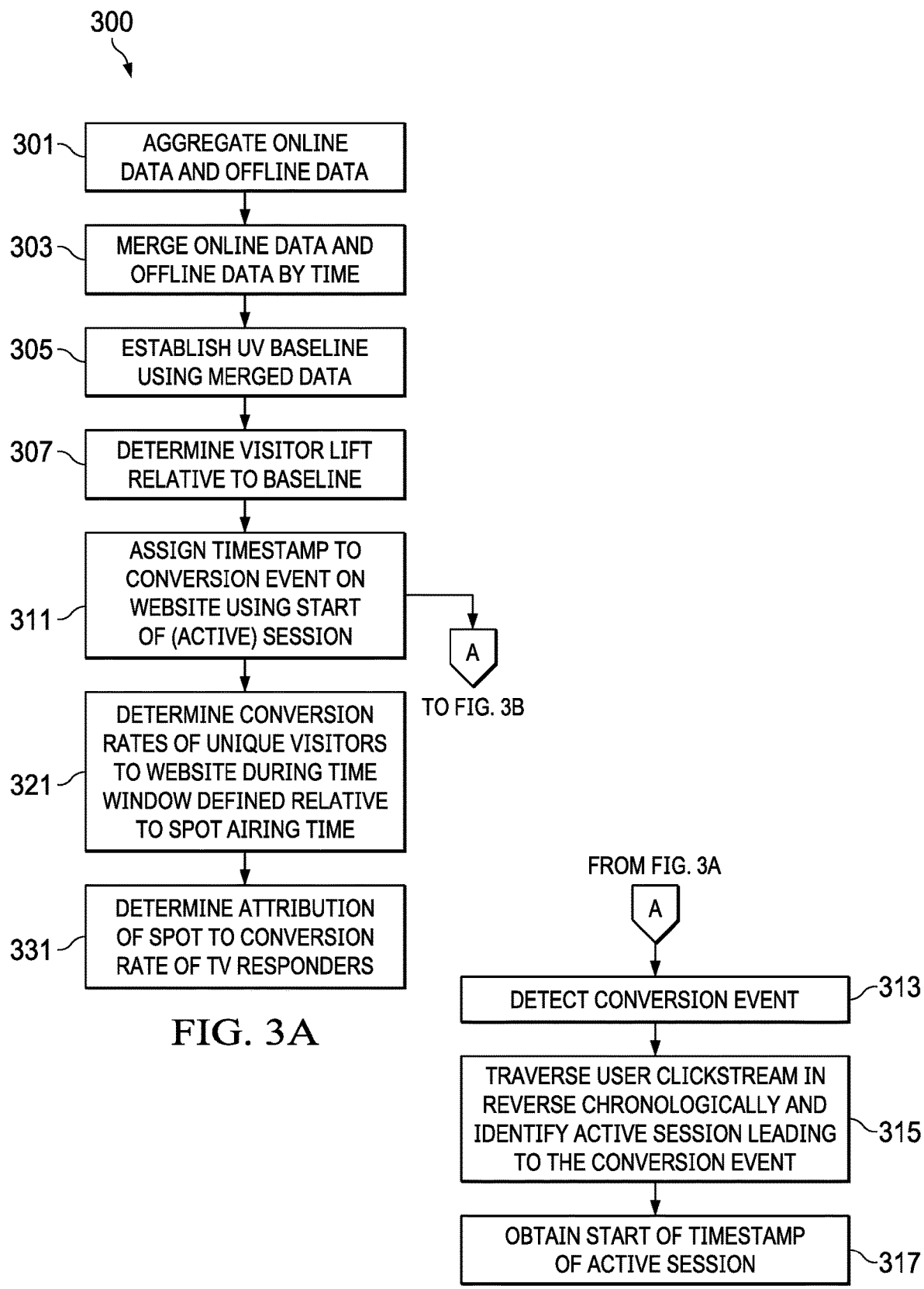
FIG. 3A is a flow chart illustrating a method for attributing TV conversions according to some embodiments.
FIG. 3B is a flow chart illustrating additional details of the method of FIG. 3A according to some embodiments.

FIG. 3A is a flow chart illustrating an example of a TV conversion attribution method. In some embodiments, an attribution server implementing method 300 may aggregate, receive, and/or obtain online data and offline data from various data sources, such as those shown in FIG. 2 (301). As illustrated in FIG. 2, offline data can be obtained from and/or provided by TV networks. Prelogs and postlogs are TV network airing logs. "Prelog" refers to the planned schedule of TV spot purchases for a client of an attribution system (e.g., attribution system 100) where the attribution server operates. Prelog contains information identifying such TV spots by network (with or without location information), date, and time in advance of the airing. "Postlog" refers to the actual times when spots aired on TV networks. Rates are how much the TV networks charge for commercial spots placed at various times of the day. Likewise, spot airing data, program schedules, and program demographics can be obtained or provided by TV networks and/or media agencies.

Online data can be obtained from and/or provided by digital data providers. These can include clickstream data from a data analytics provider which can include the number of unique visitors (UVs) for a website, the number of applications (apps) downloaded from an electronic site or store, the number of purchases made on a website or app, etc. Online data can be collected from a variety of sources, including websites, digital devices, consumer electronics, etc.

The offline data and the online data aggregated by and at the attribution server can be processed so that they are merged temporally to provide a minute-by-minute account of what is occurring in both the offline world and the online world (303). In some embodiments, the attribution server can generate a unique visualization that overlays the offline data and the online data chronologically, as illustrated in FIG. 4.

Figure 4:
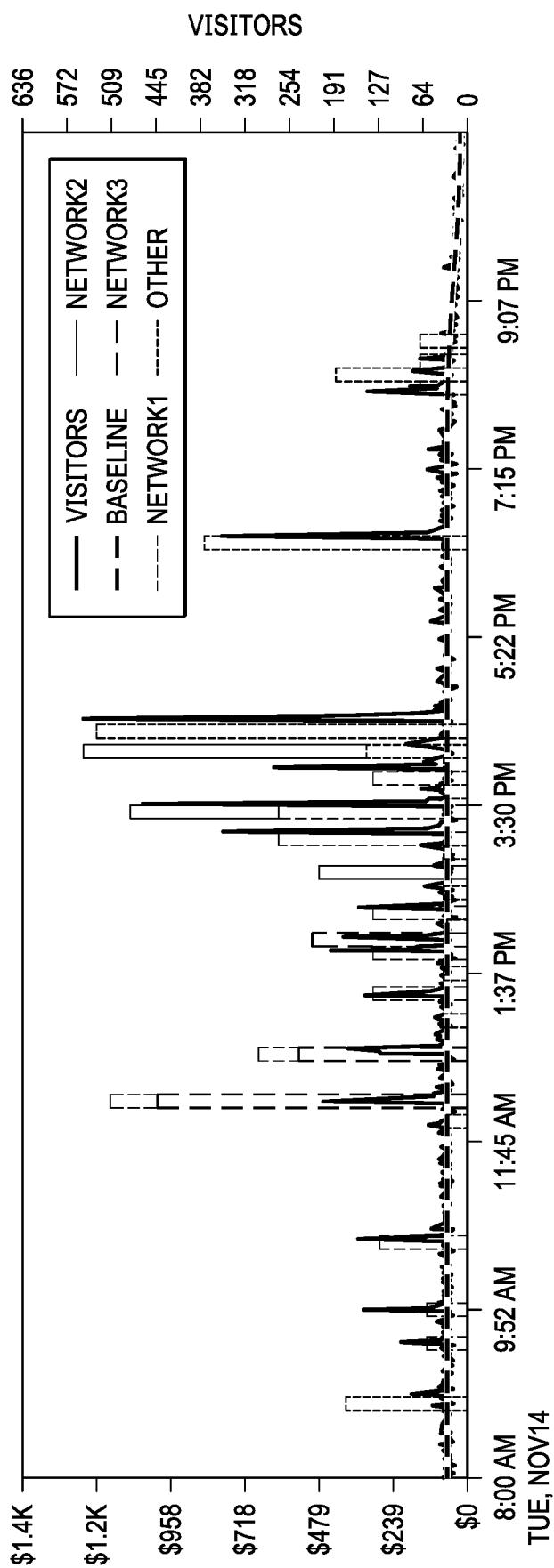
FIG. 4 depicts a diagrammatic representation of a user interface showing a unique visualization that overlays offline data and online data chronologically according to some embodiments.

FIG. 4 depicts a diagrammatic representation of UI 400 showing that a graph generated based on TV viewership (which represents the offline data) can be overlaid on top of or under another graph generated based on UVs of a website (which represents the online data) chronologically (e.g., on a minute by minute basis). In this example, the offline data graph shows spot airings and corresponding ad costs across multiple networks (e.g., Network1, Network2, Network3, etc.) during a time period (e.g., 8 AM~11 PM) and the online data graph shows jumps in the number of UVs to the website relative to the website's baseline over the same time period. UI 400 can be generated by a visualization functionality of an attribution server disclosed herein (e.g., visualizer 120, attribution server 200, etc.) and presented to a user on the user's device (e.g., client device 180a, . . . , 180n) over the Internet.

Referring to FIG. 3A, the merged data can be used to establish a baseline of website visitor traffic (305). There can be many ways to establish such a baseline. For example, a website visitor traffic baseline can be established by taking a moving average of UVs to a website throughout the day and/or the week and excluding UVs that clearly do not come because of any TV spots (e.g., UVs that came to the website through a link in an email, through a referring website, etc.). This is referred to as a UV baseline and is particular for TV conversion attribution computation (because it excludes non-TV influences). The UV baseline essentially plots, over the course of a timespan, what is considered normal website visitor traffic to a website relative to TV spots, as reflected in the number of UVs to the website. A suitable baselining technology can be found in U.S. Provisional Application No. 62/776,583, filed on Dec. 7, 2018, entitled "SELF-CONSISTENT INCEPTION ARCHITECTURE FOR EFFICIENT BASELINING MEDIA CREATIVES," which is fully incorporated by reference herein.

Different TV spots may contain different messages to TV viewers. For instance, while some TV spots may be directed to a physical product, some TV spots may be directed to an online service, a new application install, an email registration, a game download, a signature for an online petition, etc. For the purpose of illustration, suppose a TV spot calls for viewers to take a certain action through a particular website (e.g., visit a website, buy a product or service through the website, download and/or install an application from the website, sign a petition at the website, etc.), a "conversion" event (which is also referred to herein as a "conversion") occurs when a UV to the particular website takes that action (e.g., the UV visited the website, the UV purchased the product or service through the website, the UV downloaded and/or installed the application through the website, the UV signed a petition at the website, etc.). Such conversions can be considered as a conversion lift by the TV spot.

"Lift" is a quality metric for measuring the performance of a spot in the context of a particular type of campaign. In this case, since the merged data contains the minute-by-minute cohort (i.e., all the UVs to the website during the same minute), the attribution server can calculate a conversion rate based on the cohort and determine the visitor lift relative to the UV baseline (307). In statistics, a cohort refers to a group of subjects or items that share a defining characteristic. Because cohort data is usually tied to a specific time period, it is considered more accurate. In some embodiments, cohorts can be found by examining every minute in a day for a number of days during which offline data and online data have been aggregated and merged with regard to a particular website. An overall conversion rate is computed for each minute (discussed below). A goal here is to isolate the conversion rate during a particular time window (which is referred to herein as an attribution window) for a particular TV spot aired on a particular network.

Because a cohort based on which the conversion rate is calculated may include both linear TV viewers and non-linear-TV viewers, the initial result from this calculation can be skewed. For example, suppose a spot aired on a TV network at 6:20 PM and a lift (an increase in the conversion rate) occurred shortly after 6:20 PM, it is possible that the lift can be attributed to the spot that aired at 6:20 PM. However, it is unclear how much of that lift can actually be attributed to the spot that aired at 6:20 PM.

One way to eliminate this skew and quantify the attribution of such a lift to TV conversion is to examine session timestamps, correlate session timestamps to the spot airing data, and assign a timestamp to a conversion event that occurred on a website (311). As illustrated in FIG. 3B, in some embodiments, this examination can be triggered when the attribution server detects or otherwise determines that a conversion event has occurred with respect to a UV (313). In response, the attribution server is operable to traverse a clickstream associated with the UV in reverse chronologically. This can be done by examining every minute of the UV's visit to the website from the time the conversion event took place to when the UV first started the session that led to the conversion. This session is identified as the "active session" (315).

The timestamp of this active session is obtained (317) and assigned to the conversion event. This conversion-triggered examination and assignment of session timestamp means that the attribution server does not need to actively track and store all UV sessions at all times. Rather, the attribution server only needs to know when and what key events happened at a website (e.g., a sale, a new email registration, a new UV, etc.) and, after a conversion by a UV occurs, review the UV's clickstream and find the appropriate session timestamp. For example, a UV first visits a website at 1:15 PM, clicks on a menu at 1:17 PM, and purchased an item through the website at 1:21 PM. Here, the timestamp for the conversion event is 1:21 PM and the timestamp for the active session is 1:15 PM. The attribution server reviews the UV's clickstream, finds the timestamp for the active session "1:15 PM," and assigns it to the conversion event.

The TV conversion attribution technology disclosed herein utilizes the timestamp associated with the active session instead of the actual time when the conversion event took place because the timestamp associated with the active session is the closest in time that the attribution server can associate the online conversion event with an offline spot airing event (i.e., when a TV conversion occurs). That is, the attribution server is concerned with correlating the timing of a UV showing up at an online medium (which led to the UV ultimately taking the desired action through the online medium) to the timing of a TV spot airing through an offline medium (which conveyed a message of taking the desired action through the online medium). This correlation enables the attribution server to more accurately associate the conversion event for the UV (not based on when the conversion event took place, but based on when the UV started the process which lead to the conversion event) with a window of time when a spot aired on a TV network. In some embodiments, the term "network" can include all stations affiliated with a particular network. In some embodiments, the term "network" can refer to a set of stations representing the network, for instance, in a geographical locale, region, or time zone.

The conversion event timestamp assignment process described above is irrespective of the spot airing date/time. The assigned timestamps for conversion events taking place online can then be correlated to when spots aired offline. In some embodiments, the attribution server can store this correlation in a database.

There are other ways to determine what conversion events at an online medium could be attributed to a spot that aired through an offline medium may begin with the examination of UV sessions initiated at the online medium within an attribution window associated with the spot that aired through the offline medium. For instance, following the above example in which a spot aired on a TV network at 6:20 PM, the attribution server is operable to examine UV sessions initiated at the website within a five minute window starting at 6:20 PM (e.g., each of five minutes at 6:20 PM, 6:21 PM, 6:23 PM, 6:24 PM, and 6:25 PM) and determine whether a conversion ultimately occurs in a UV session. If so, the attribution server is operable to assign the start of the UV session (i.e., the timestamp for the active session) to the conversion. In turn, the conversion is correlated to the spot associated with the attribution window.

As a non-limiting example, suppose the spot aired on the TV network at 6:20 PM on Day One with a message for viewers to donate to a charity. A UV initiated a session with the charity's website at 6:25 PM on Day One and subsequently made a donation (e.g., a hour, a day, or even a week later). In this example, the attribution server assigns 6:25 PM on Day One, when the UV initiated the session with the charity's website, as the timestamp for the conversion event. Because the timestamp of 6:25 PM falls within the five minute attribution window for the spot, the conversion event is correlated to the spot that aired on the network at 6:20 PM.

Figure 5:
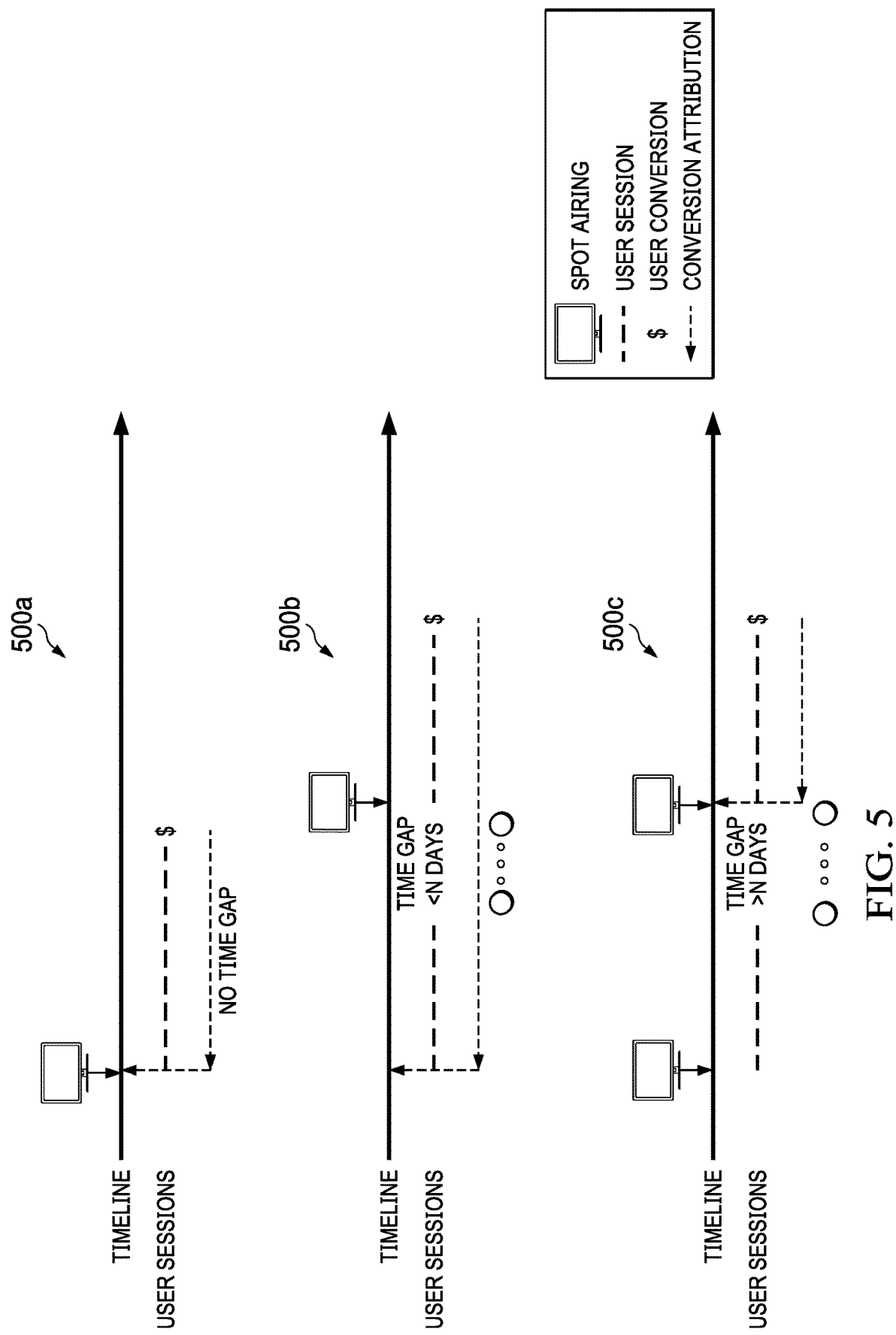
FIG. 5 illustrates diagrammatically how an attribution server can determine an appropriate session timestamp for a conversion event according to some embodiments.

In some cases, a conversion (which, in this example, is a donation made through the website) can take place in the same session with no time gap. This scenario is illustrated in FIG. 5 (e.g., scenario 500A). In some cases, there could be a time gap between visits by the same UV to the website. This scenario is also illustrated in FIG. 5 (e.g., scenario 500B or scenario 500C).

As scenario 500B illustrates, if there is a time gap between when a UV first visits an online medium and when the UV takes a desired action (e.g., a user conversion) through that online medium, the attribution server may use the earliest session timestamp as the timestamp for the user conversion if the time gap is not more than a predetermined threshold (e.g., three months, six months, one year, etc.). As scenario 500C illustrates, the attribution server may use the latest (active) session timestamp as the timestamp for a conversion event if the most recent session and the one before it has a temporal gap that is larger than the predetermined threshold. That is, if there are multiple sessions, the attribution server may select an appropriate active session based on the size of a temporal gap between the multiple sessions.

Now that each conversion event has an assigned timestamp, the attribution server may operate to determine conversion rates of UVs of a website during a time window defined relative to the spot airing time (321). The attribution server may keep a file (e.g., in data store 130) for every UV to a particular website (from the online data), documenting when UVs visit the website, when their sessions started, and when/if a conversion event took place. The attribution server can compare, on a minute by minute basis, user interactions with the website relative to when a sport aired (e.g., at 6:25 PM). For example, using a fixed window (e.g., five minutes for this website), anything occurred during 6:22 PM-6:27 PM, the attribution server can determine how UVs visited the website in that window of time and how many conversion events have taken place in that window of time. This gives an overall conversion rate in the TV window (which includes both TV responders and non-TV responders).

As a non-limiting example, suppose there are a total of 100 UVs to the website over a five-minute window and 10 of them made a purchase. This results in a 10% conversion rate in general for that window. This overall conversion rate can be defined as follows:

Conversion rate=number of conversions that occurred as a result of UVs that started their session within a time window/number of UVs within the time window. Or $$\text{conversion rate}(tv) = r(tv) = \sum_t \frac{c}{n},$$

where c=# conversions in that minute,
n=# UVs in that minute,
t∈ (set of all tv attribution windows)

This conversion rate covers all UVs to the website regardless of what drove them to the website. Since these UVs could include TV responders who responded to a spot aired on a network (offline) and non-TV responders who did not visit the website because of the spot, the attribution of airing the spot on TV to the overall conversion rate is unclear. Accordingly, in some embodiments, the attribution server is operable to determine how much of this conversion rate can be attributed to TV (i.e., the conversion rate of TV responders) (331).

In some embodiments, a determination of TV attribution to a conversion rate can be made by isolating the lift caused by TV on a minute by minute basis, determining a new alpha factor (a), and adjusting the conversion rate using the alpha factor. In this disclosure, the alpha factor represents a ratio between the conversion rate of TV UVs and the conversion rate of non-TV UVs.

To understand the conversion rate of TV UVs, an example of a conversion flow that involves both the online world and the offline world may be helpful. Suppose John Doe is offline. John may see a TV spot while walking by a TV. The spot encourages viewers to sign a petition for a good cause and provides an URL of a website. Intrigued, John pulls out his mobile device (e.g., a smart phone, a tablet, a laptop, etc.) and directs a browser on his device to the URL of the website. Since John has never visited the website before, John is a UV to the website. After browsing through the website, John decides to support the cause and signs the petition. A server hosting or monitoring the website records this new UV session and sends the clickstream data to the attribution server. The attribution server determines an appropriate session timestamp (which indicates the time when John first visits the website) for the conversion event (which, in this example, refers to John signing the petition) and, based on the session timestamp, correlates the conversion event to a time window within which John saw the TV spot. In this conversion flow, John is considered a TV responder or a TV UV.

As discussed above, a lift can be computed and associated with each minute the attribution server has data for a website (e.g., every minute across all the days and months running a campaign). Also assigned to each minute is a percentage of lift (e.g., 0 to 100%) that came from immediate TV responders such as John Doe described above. Below is an example of how this percentage of TV-attributed lift can be determined.

Figure 6:
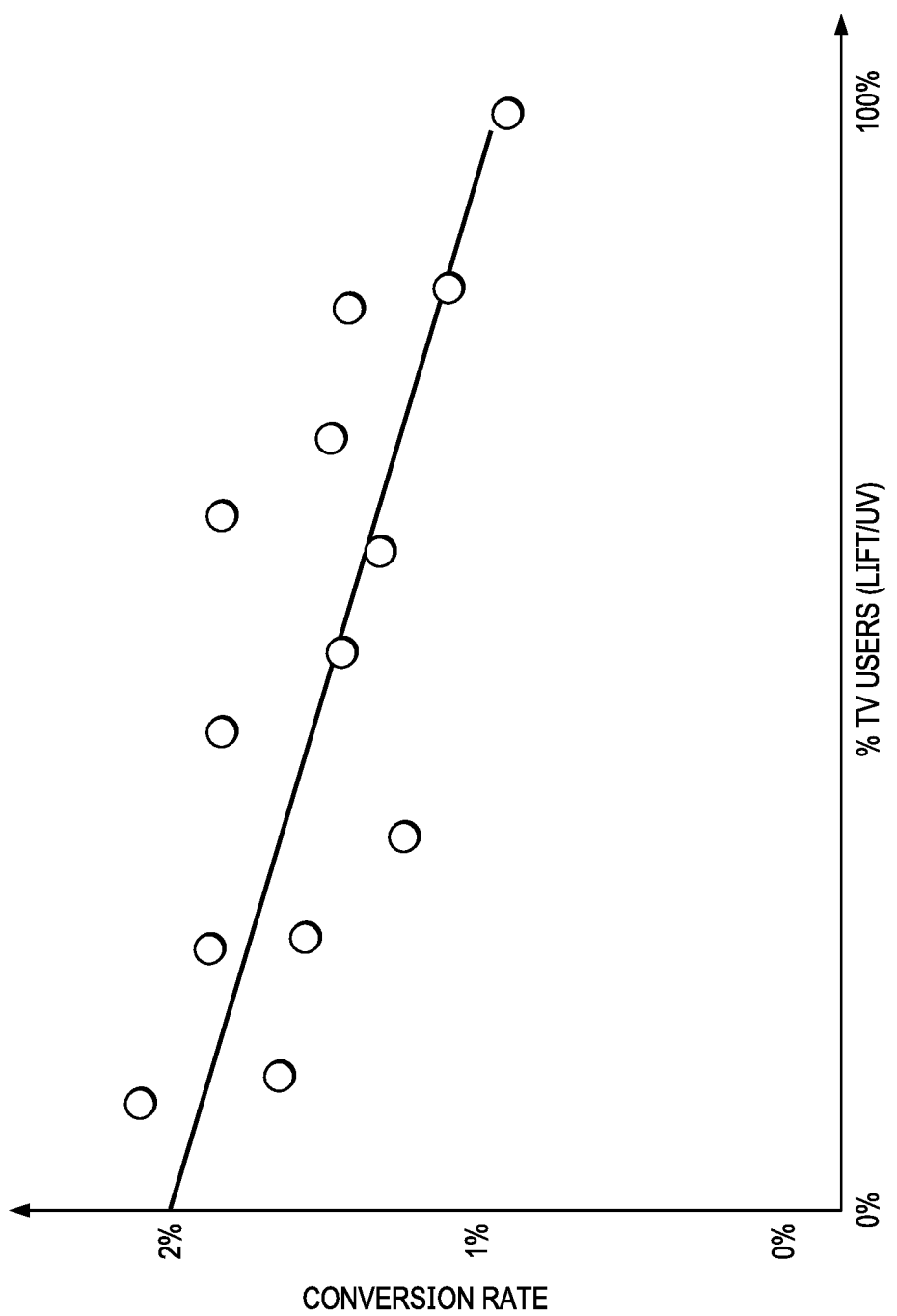
FIG. 6 is a plot diagram illustrating an example of a relationship between an online medium's conversion rate and a percentage of unique visitors driven to the online medium by an offline medium according to some embodiments.

Suppose the attribution server has computed the overall conversion rate (i.e., the number of conversion events divided by the number of UVs per minute) as described above. FIG. 6 is a plot diagram which shows an example scenario in which the overall conversion rate is 2% when the percentage of TV users is 0 and, when the percentage of TV users is 100, the overall conversion rate is 1%. In this example, the TV users have half the conversion rate in general than the non-TV users. This ratio is represented by the alpha factor. The alpha factor can be determined using an ordinary least squares (OLS) regression technique as follows:

$$y = \alpha_0 + \alpha X + \varepsilon,$$

where y=vector of conversion rates by minute and X=vector of % TV users (lift/UV) per minute.

The attribution server is operable to identify the subsequent attribution window after the spot aired for which credit will be given to that TV spot as having contributed to the incremental lift over the UV baseline. That is, the attribution server is operable to examine the percentage of TV users for each of those minutes and solves what that alpha factor is at 100% TV lift to 0 TV lift.

Once the alpha factor is determined, the conversion rate for TV responders can be determined by multiplying the number of conversions by a factor lambda ($\lambda$) representing the influence of those TV responders. This is reflected in the new equation below:

$$\text{conversion rate}(tv) = r(tv) = \sum_t \frac{\lambda_t c_t}{m_t},$$

where $\lambda = \frac{\alpha p}{\alpha p + (1-p)}$, $m =$ lift and $p =$ likelihood of user being from $tv = \frac{lift}{UV}$ for that minute, a=ratio of tv conversion rate to nontv conversion rate By computing this equation, the attribution server can determine the conversion that can be attributed to TV responders (i.e., TV conversion attribution). That is, the attribution server is operable to examine the total conversion rate relative to a specific lift, multiplying the total number of conversions by the lambda factor, which is the alpha factor times p divided by the alpha factor times p plus one minus p. Put another way, the conversions that were tracked and ascribed to those UVs in a TV window (a cohort) are adjusted by the proportion of TV viewer conversions responding in that window; i.e., proportion of conversions associated with TV viewer lift divided by the proportion of conversions associated with TV viewer lift plus the proportion of conversions associated with non-TV viewers. This is the conversion rate of immediate TV responders.

Essentially, the attribution server examines all occurrences of TV spots and isolates the UVs that started their sessions within a TV attribution window. Then, the attribution server assigns conversions to those UVs. Generally, this approach can be described as follows:

Compute user-level fuzzy likelihoods: Identify likelihood, P(TV), of each user coming in from TV. As an example, the attribution server looks at the minute-by-minute cohorts—if a lift of 10 on total traffic that minute of 100, then all users that minute assigned 10% odds of coming from TV.

Increase accuracy of conversion estimates: The attribution server examines the conversion rate per cohort relative to the percentage lift per cohort, and creates an attribution model that leverages the conversion rate per cohort relative to the percentage lift per cohort as well as the network. An objective here is to modify the approach from one of assuming the conversion rate for each cohort is the same throughout the cohort to one of adjusting for potential differences in conversion rate for TV responders vs non-TV responders within the cohort.

This invention provides a reasonable prediction to fill the data gap between the online media and the offline media. Streaming TV services do not need to do these processes and perform these calculations because timing information is readily available—when does a viewer watch what program or spot is digitally recorded, as well as when that viewer then visits a website and how that viewer interacts with the website. The data gap problem is a unique problem to linear TV spots because there is no way to "tag" a TV responder when they visit a website—there is not a one-to-one relationship between an offline source (e.g., linear TV) and the conversion rate for the website.

As a non-limiting example, suppose a TV spot aired near 6:22 PM. In the first minute of that airing, a website records 360 UVs, with a baseline of 36. This yields a probability (p) of 0.9 (p=0.9)–90% of UVs visiting the website in that minute would have been projected as coming from watching a TV ad. Assuming that the website ultimately has 18 conversions associated with those UVs who visited the website during that minute, with an alpha factor of 0.5, this would yield an equation of:

$$\lambda = \frac{\alpha p}{\alpha p + (1-p)} = \frac{0.5 * 0.9}{0.5 * 0.9 + 0.1} = .45/.55 = 0.818$$

In turn, this yields an adjusted TV conversion rate for that minute, t, of:

$$\text{conversion rate}(tv) = r(tv) = \frac{\lambda c}{m} = \frac{0.818 * 18}{(360 - 36)} = 0.0454$$

This conversion rate reflects the attribution of that TV spot to the overall conversions at that website during the attribution window.

Figure 7:
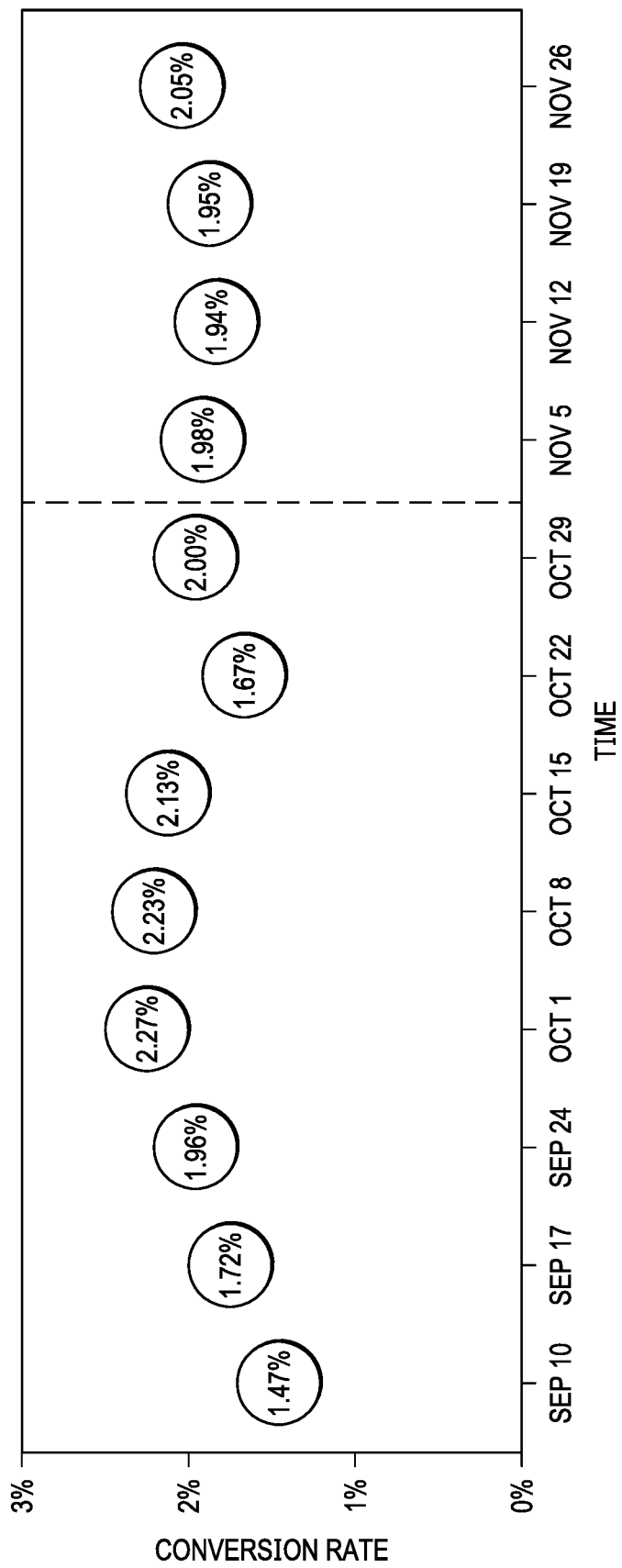
FIG. 7 depicts a diagrammatic representation of an example user interface showing a visualization of results generated by an attribution server, the results including a percentage of an online medium's conversion rate that can be quantifiably attributed to an offline medium according to some embodiments.
Figure 8:
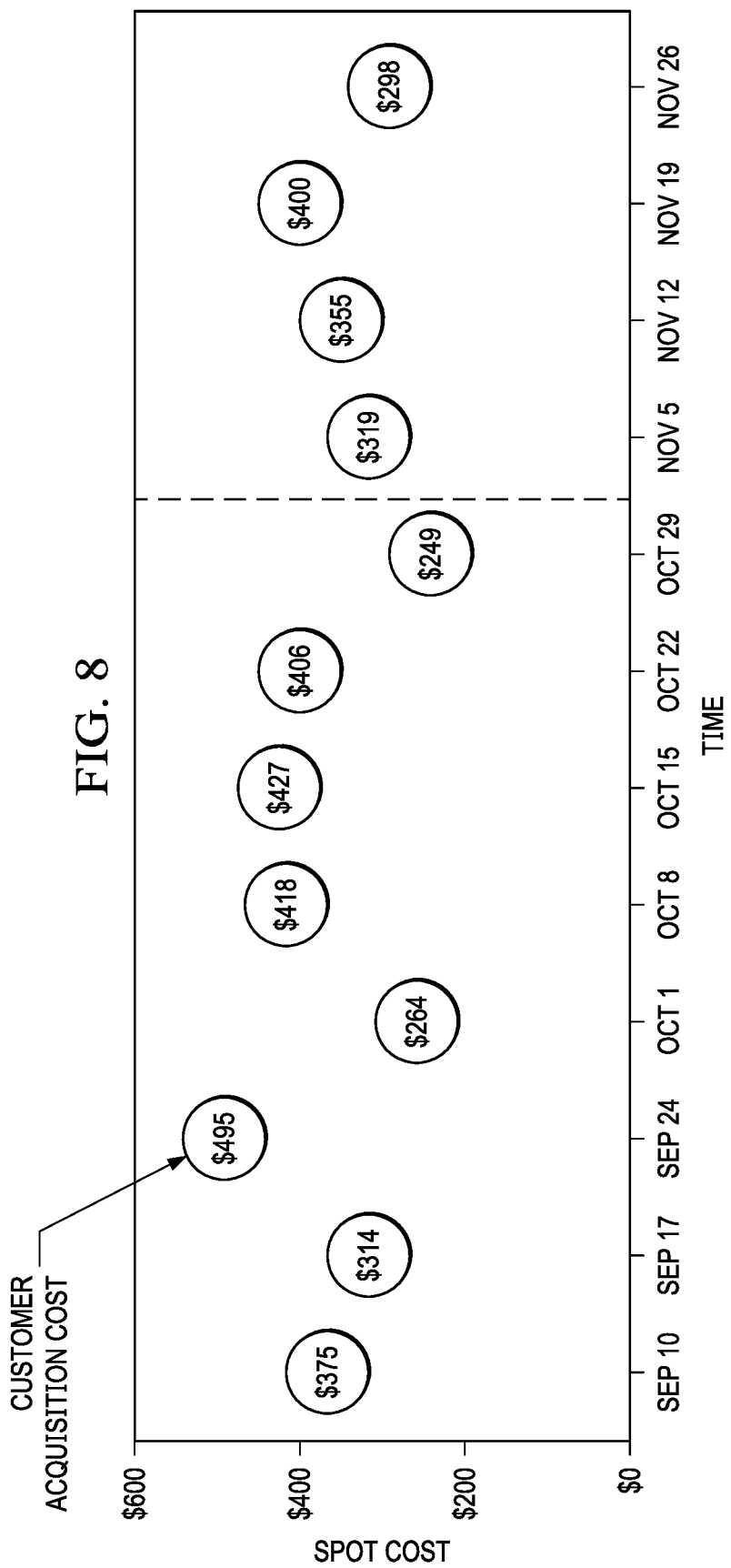
FIG. 8 depicts a diagrammatic representation of another example user interface showing a visualization of results generated by an attribution server, the results including a customer acquisition cost that can be quantifiably attributed to an offline medium according to some embodiments.

The computed TV conversion attribution can be visualized and presented on various client devices (e.g., client devices 180a, . . . 180n). As illustrated in FIGS. 7 and 8, TV can be attributed to a website's UV conversion rate over time in view of different metrics. FIG. 7 shows an example of a percentage of TV attribution to an overall UV conversion rate over time with respect to purchases made by UVs to the website. FIG. 8 shows an example of spot cost-per-UV conversion (customer acquisition cost) over time. These visualizations can be generated and presented to various client devices by a visualizer (e.g., visualizer 120).

Figure 9:
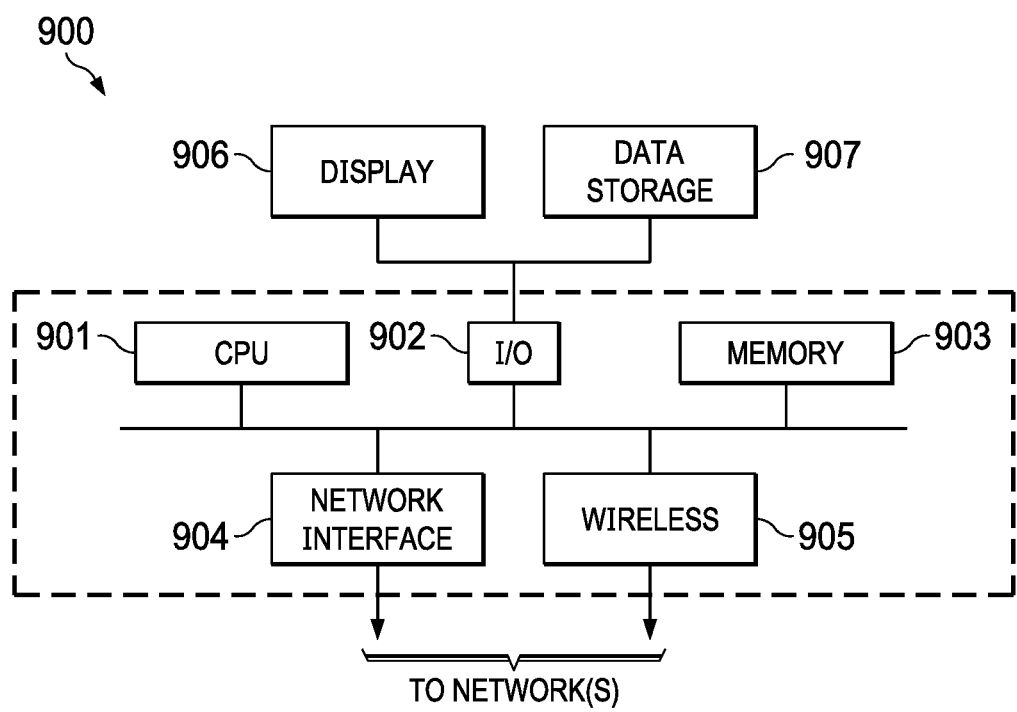
FIG. 9 depicts a diagrammatic representation of a data processing system for implementing a system according to some embodiments.

FIG. 9 depicts a diagrammatic representation of a data processing system for implementing a system for processing messages. As shown in FIG. 9, data processing system 900 may include one or more central processing units (CPU) or processors 901 coupled to one or more user input/output (I/O) devices 902 and memory devices 903. Examples of I/O devices 909 may include, but are not limited to, keyboards, displays, monitors, touch screens, printers, electronic pointing devices such as mice, trackballs, styluses, touch pads, or the like. Examples of memory devices 903 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 900 can be coupled to display 906, information device 907 and various peripheral devices (not shown), such as printers, plotters, speakers, etc. through I/O devices 902. Data processing system 900 may also be coupled to external computers or other devices through network interface 904, wireless transceiver 905, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including Python. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise. The scope of the present disclosure should be determined by the following claims and their legal equivalents.

What is claimed is:

1. A method for attributing offline conversions, comprising:
   aggregating online data and offline data, the aggregating performed by an attribution system having a processor and a non-transitory computer-readable medium;
   merging, by the attribution system, the online data and the offline data chronologically, wherein the merging produces chronologically merged data that provides a minute-by-minute account of what occurs online and offline;
   examining, by the attribution system, the chronologically merged data from the merging for unique visitor (UV) sessions initiated at an online medium within an attribution window of time for a spot that aired on an offline medium, the examining comprising:
       determining, for each UV session of the UV sessions, whether a conversion event occurred at the online medium in the each UV session; and
       responsive to the conversion event occurring at the online medium in the each UV session, assigning a session timestamp to the conversion event, the session stamp indicating a start of the each UV session, the conversion event associated with the spot that aired on the offline medium through assignment of the session timestamp;
   determining, by the attribution system, an overall conversion rate of UVs to the online medium in the attribution window of time;
   determining, by the attribution system, attribution by the spot that aired on the offline medium to the overall conversion rate of UVs to the online medium in the attribution window of time, the determining the attribution comprising examining, on a minute by minute basis, the overall conversion rate relative to a specific lift in the UVs to the online medium that is caused by the offline medium in the attribution window of time; and
   generating, by the attribution system for presentation on a client device, a visualization of the attribution by the spot that aired on the offline medium to the overall conversion rate of UVs to the online medium in the attribution window of time.

2. The method according to claim 1, wherein the online medium comprises a website and wherein the offline medium comprises a television network.

3. The method according to claim 1, wherein the merging further comprises mapping the online data and the offline data on a minute by minute basis.

4. The method according to claim 1, further comprising:
   isolating the specific lift caused by the offline medium in the attribution window of time from a total lift in the UVs to the online medium, the total lift determined using a UV baseline established through the data from the merging;
   determining an alpha factor, the alpha factor representing a ratio between a conversion rate of UVs driven to the online medium by the spot that aired on the offline medium and a conversion rate of UVs to the online medium not driven by the spot that aired on the offline medium; and
   adjusting the overall conversion rate of UVs to the online medium in the attribution window of time using the alpha factor.

5. The method according to claim 1, further comprising:
determining whether a time gap exists between a timestamp associated with a start of a UV session associated with a UV and a timestamp for a conversion of the UV;
responsive to existence of the time gap, comparing the time gap with a predetermined threshold;
responsive to the time gap exceeding the predetermined threshold, determining a UV session associated with the UV that is temporally closest to the timestamp for the conversion of the UV; and
utilizing a timestamp of the UV session associated with the UV that is temporally closest to the timestamp for the conversion of the UV as the session timestamp.

6. The method according to claim 2, further comprising:
generating a first graph based on viewership of the television network;
generating a second graph based on UVs of the website;
overlaying the first graph and the second graph chronologically; and
generating a visualization of the first graph and the second graph overlaid on top of one another for presentation on the client device.

7. The method according to claim 2, wherein the online data comprises clickstream data from the website and wherein the offline data comprises spot airing data from the television network.

8. A system, comprising:
a processor;
a non-transitory computer-readable medium; and
stored instructions translatable by the processor for:
aggregating online data and offline data;
merging the online data and the offline data chronologically, wherein the merging produces chronologically merged data that provides a minute-by-minute account of what occurs online and offline;
examining the chronologically merged data from the merging for unique visitor (UV) sessions initiated at an online medium within an attribution window of time for a spot that aired on an offline medium, the examining comprising:
determining, for each UV session of the UV sessions, whether a conversion event occurred at the online medium in the each UV session; and
responsive to the conversion event occurring at the online medium in the each UV session, assigning a session timestamp to the conversion event, the session stamp indicating a start of the each UV session, the conversion event associated with the spot that aired on the offline medium through assignment of the session timestamp;
determining an overall conversion rate of UVs to the online medium in the attribution window of time;
determining attribution by the spot that aired on the offline medium to the overall conversion rate of UVs to the online medium in the attribution window of time, the determining the attribution comprising examining, on a minute by minute basis, the overall conversion rate relative to a specific lift in the UVs to the online medium that is caused by the offline medium in the attribution window of time; and
generating, for presentation on a client device, a visualization of the attribution by the spot that aired on the offline medium to the overall conversion rate of UVs to the online medium in the attribution window of time.

9. The system of claim 8, wherein the online medium comprises a website and wherein the offline medium comprises a television network.

10. The system of claim 8, wherein the merging further comprises mapping the online data and the offline data on a minute by minute basis.

11. The system of claim 8, wherein the stored instructions are further translatable by the processor for:
isolating the specific lift caused by the offline medium in the attribution window of time from a total lift in the UVs to the online medium, the total lift determined using a UV baseline established through the data from the merging;
determining an alpha factor, the alpha factor representing a ratio between a conversion rate of UVs driven to the online medium by the spot that aired on the offline medium and a conversion rate of UVs to the online medium not driven by the spot that aired on the offline medium; and
adjusting the overall conversion rate of UVs to the online medium in the attribution window of time using the alpha factor.

12. The system of claim 8, wherein the stored instructions are further translatable by the processor for:
determining whether a time gap exists between a timestamp associated with a start of a UV session associated with a UV and a timestamp for a conversion of the UV;
responsive to existence of the time gap, comparing the time gap with a predetermined threshold;
responsive to the time gap exceeding the predetermined threshold, determining a UV session associated with the UV that is temporally closest to the timestamp for the conversion of the UV; and
utilizing a timestamp of the UV session associated with the UV that is temporally closest to the timestamp for the conversion of the UV as the session timestamp.

13. The system of claim 9, wherein the stored instructions are further translatable by the processor for:
generating a first graph based on viewership of the television network;
generating a second graph based on UVs of the website;
overlaying the first graph and the second graph chronologically; and
generating a visualization of the first graph and the second graph overlaid on top of one another for presentation on the client device.

14. The system of claim 9, wherein the online data comprises clickstream data from the website and wherein the offline data comprises spot airing data from the television network.

15. A computer program product comprising a non-transitory computer-readable medium storing instructions translatable by a processor for:
aggregating online data and offline data;
merging the online data and the offline data chronologically, wherein the merging produces chronologically merged data that provides a minute-by-minute account of what occurs online and offline;
examining the chronologically merged data from the merging for unique visitor (UV) sessions initiated at an online medium within an attribution window of time for a spot that aired on an offline medium, the examining comprising:
determining, for each UV session of the UV sessions, whether a conversion event occurred at the online medium in the each UV session; and responsive to the conversion event occurring at the online medium in the each UV session, assigning a session timestamp to the conversion event, the session stamp indicating a start of the each UV session, the conversion event associated with the spot that aired on the offline medium through assignment of the session timestamp;

determining an overall conversion rate of UVs to the online medium in the attribution window of time;

determining attribution by the spot that aired on the offline medium to the overall conversion rate of UVs to the online medium in the attribution window of time, the determining the attribution comprising examining, on a minute by minute basis, the overall conversion rate relative to a specific lift in the UVs to the online medium that is caused by the offline medium in the attribution window of time; and generating, for presentation on a client device, a visualization of the attribution by the spot that aired on the offline medium to the overall conversion rate of UVs to the online medium in the attribution window of time.

16. The computer program product of claim 15, wherein the online medium comprises a website and wherein the offline medium comprises a television network.

17. The computer program product of claim 16, wherein the instructions are further translatable by the processor for:
generating a first graph based on viewership of the television network;
generating a second graph based on UVs of the website;
overlaying the first graph and the second graph chronologically; and
generating a visualization of the first graph and the second graph overlaid on top of one another for presentation on the client device.

18. The computer program product of claim 16, wherein the online data comprises clickstream data from the website and wherein the offline data comprises spot airing data from the television network.

19. The computer program product of claim 16, wherein the instructions are further translatable by the processor for:
isolating the specific lift caused by the offline medium in the attribution window of time from a total lift in the UVs to the online medium, the total lift determined using a UV baseline established through the data from the merging;
determining an alpha factor, the alpha factor representing a ratio between a conversion rate of UVs driven to the online medium by the spot that aired on the offline medium and a conversion rate of UVs to the online medium not driven by the spot that aired on the offline medium; and
adjusting the overall conversion rate of UVs to the online medium in the attribution window of time using the alpha factor.

20. The computer program product of claim 16, wherein the instructions are further translatable by the processor for:
determining whether a time gap exists between a timestamp associated with a start of a UV session associated with a UV and a timestamp for a conversion of the UV;
responsive to existence of the time gap, comparing the time gap with a predetermined threshold;
responsive to the time gap exceeding the predetermined threshold, determining a UV session associated with the UV that is temporally closest to the timestamp for the conversion of the UV; and
utilizing a timestamp of the UV session associated with the UV that is temporally closest to the timestamp for the conversion of the UV as the session timestamp.

* * * * *